Oct. 16, 1962
H. HENSS
3,058,140
MANUALLY OPERATED COLLAPSIBLE WALL PUMP FOR WINDOW-WASHERS IN AUTOMOTIVE VEHICLES
Filed May 12, 1961
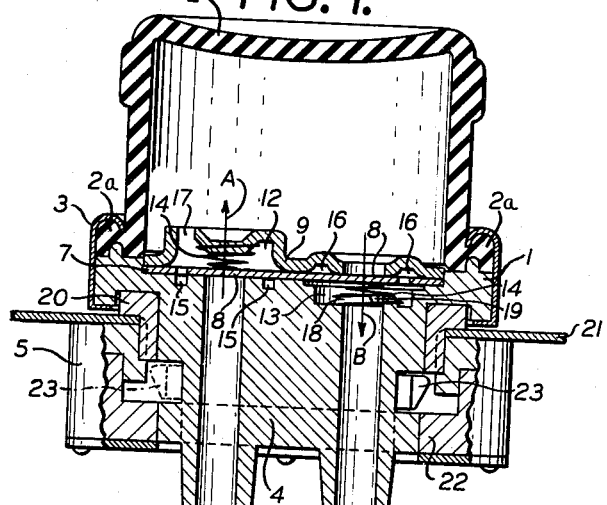
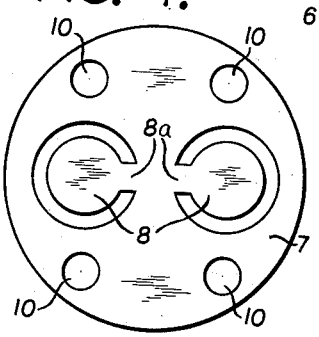
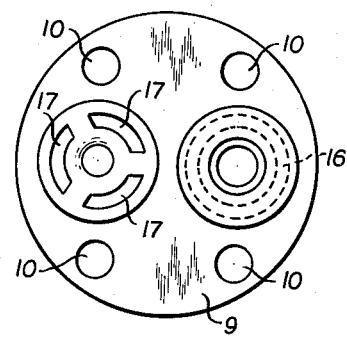
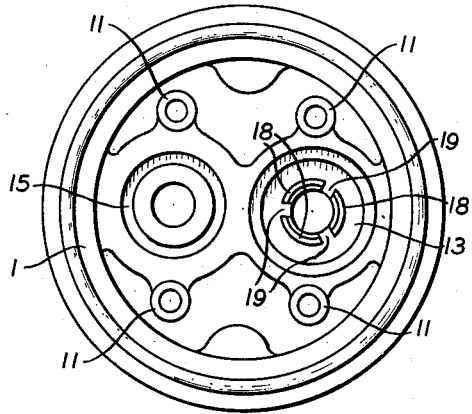
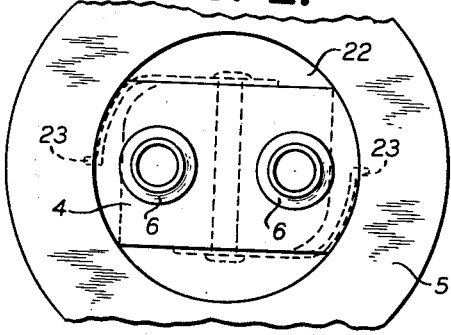
INVENTOR
HEINRICH HENSS
BY
ATTORNEY.

United States Patent Office 3,058,140
Patented Oct. 16, 1962

3,058,140
MANUALLY OPERATED COLLAPSIBLE WALL PUMP FOR WINDOW-WASHERS IN AUTOMOTIVE VEHICLES
Heinrich Henss, Oberhochstadt (Taunus), Germany, assignor to VDO Tachometer Werke Adolf Schindling G.m.b.H., Frankfurt am Main, Germany, a corporation of Germany
Filed May 12, 1961, Ser. No. 109,677
Claims priority, application Germany June 10, 1960
5 Claims. (Cl. 15—250.01)

The present invention relates to a manually operated, collapsible wall pump for window-washers in automotive vehicles, in general, and such devices in combination with a switch for the drive of window wipers, in particular.

In known embodiments of such window-washer arrangements, the collapsible wall of the pump is always disposed behind the dashboard and can be operated by a manually operated pressure or pulling member. The pushing or pulling movement or also a rotation of the operating member of the collapsible wall pump is used, thereby, for the selective or forced operation of the window wiper switch.

The known structures require a certain building space behind the dashboard.

It is one object of the present invention to provide a manually operated, collapsible wall pump for window-washers in automotive vehicles, wherein a window washer is formed in connection with a window wiper switch, which is suitable for later installation in all vehicle models, to replace the previous window wiper switch. In order to make possible the installation of one structure, the space for installing the novel device behind the dashboard should not be appreciably larger than that for a conventional window wiper switch.

In this connection it was also investigated to what extent the delivery volume of a collapsible wall pump can be reduced in comparison with the known structures having a volume of about 20 to 30 ccm. Since it is of no importance for the operation of the pump, whether the hand performs a longer permanent pressure or a plurality of pumping movements, a delivery volume of 6 to 8 ccm. has been found as a favorable measure, which permits a sufficient, one-time spraying of the windshield, which spraying can be repeated if necessary. A small delivery volume simplifies also an economical use of the limited water storage in the vehicle.

It is another object of the present invention to provide a manually operated collapsible wall pump for window-washers in automotive vehicles, wherein the operating knob of the window wiper switch is formed as a collapsible pump wall. The operating knob comprises a cup-shaped hollow body which is of elastic material and open at one side, and the open side of which is closed up by a switching member in which the feeding valve and the delivery valve are disposed, preferably, as flat membrane valves. The switching member has an extension which defines the feeding conduits leading to the valves and which forms the switching axis of the window wiper switch.

It is yet another object of the present invention to provide a manually operated, collapsible wall pump for window-washers in automotive vehicles, wherein the collapsible wall pump is formed as an operating knob with a delivery volume of 6 to 8 ccm., and which has about the size of a conventional switch knob. By the arrangement of the feeding and delivery valves in the flat switching member and with the use of known flat membrane valves, the dead space of the collapsible wall pump for the delivery of the liquid can be maintained at a small scale.

It is still another object of the present invention to provide a manually operated collapsible wall pump for window-washers in automotive vehicles, which permits a rather advantageous manufacture and easy mounting or installation of the device.

With these and other objects in view which will become apparent in the following detailed description, the present invention will be clearly understood in connection with the accompanying drawing, in which:

FIGURE 1 is an axial section through the pump and partly through the switch;

FIG. 2 is a bottom plan view of the pump;

FIG. 3 is a top plan view of the bottom plate after removal of the membrane and of the valve cover;

FIG. 4 is a top plan view of the common membrane with the valves; and

FIG. 5 is a top plan view of the valve cover.

Referring now to the drawing, the manually operated collapsible wall pump comprises a switching member 1 which supports the collapsible pump wall 2, preferably made of rubber, by means of a ring 3 which surrounds an engagement flange 2a of the collapsible pump wall 2. The switching member 1 has a preferably integral extension 4, in which the feeding conduits to the valves are disposed and which forms a switching axis for the switch 5. The extension 4 carries in addition the pipe connections 6 for the connecting hoses to the water container (not shown) and to the spraying nozzles (not shown), respectively. The pipe connections 6 are of different lengths in order to provide a distinction therebetween, even without vision, during the connection of the connecting hoses for the pressure and suction side of the pump.

A membrane 7 of resilient material is arranged on the switching member 1, valve disks 8 being stamped out for the feeding, as well as for the delivery valve. The valve disks 8 remain in connection with the membrane 7 by means of webs 8a. The membrane 7 is clamped jointly with the two valve disks 8 between the switching member 1 and a joint valve cover 9. Short bolts 11 of the switching member 1 reach through openings 10 provided in the membrane 7 and in the valve cover 9, which bolts 11 may, for instance, serve to secure directly the valve cover 9 by proper forming. The valve cover 9 has a recess 12, which is formed by an impression, in the embodiment shown in the drawing, for the feeding valve A and the switching member 1 has a proper recess 13 for the delivery valve B. The operation of the membrane valves is supported in addition by springs 14 which are disposed in a pretensioned state between the valve disks 8 and the valve cover 9 and the switching member 1, respectively.

Rings are formed around the valve opening for a defined engagement of the valve disks 8 and an annular recess 15 and an impression 16, respectively, are provided for this purpose in the switching member 1 and the valve cover 9, respectively. For the flow of the liquid during feeding, the valve cover 9 has recesses 17 and the switching member 1 has a spacing ring 18, which has perforations 19 in order to permit the flow of the liquid. The rotary switch 5, of conventional structure, is secured by means of a nut 20 to the dashboard 21, has an electric switch for starting the drive of the window wiper (not shown). The rotary part 22 only of the switch 5 is shown in the drawing, by means of which rotary part 22 the terminals (not shown) of the switch 5 are operated in conventional manner and close and open, respectively, the electric circuit. Since the switch 5 is of conventional nature, its structure is not a part of the present invention.

The extension 4 of the bottom plate 1 has, as an axle for the switch 5, a cross-section diverging from a circle. The central rotary part 22 of the switch 5 has an opening complementary to the cross-section of the extension 4 which is inserted into this opening and is retained therein by means of collapsible securing springs 23. The extension 4 projects with the pipe connections 6 through the switch 5.

By the arrangement, set forth above, the device comprises practically two easily separable parts which can be joined and which operate jointly. The structure permits the fast replacement of a damaged pump and without removal of the switch 5. It is also possible, in case of a required repair of the damaged pump, to replace the pump provisionally with a conventional operating knob or switch having the same switching axis and to permit, thereby, the operation of the window wiper during the time the pump is removed for repair. In the same manner, it is also possible with this arrangement, to equip a vehicle for reasons of economy, particularly compact cars, in series at first only with a window wiper switch having a conventional operating knob and to leave it to the owner of the vehicle to exchange afterwards the operating knob with a collapsible wall pump fitting into the switch, in place thereof, which pump is designed in accordance with the present invention.

The present invention is not limited to a structure with a rotary switch for the drive of the window wiper. The operating knob of a slide switch can be designed in the same manner as a collapsible wall pump.

The present device, designed in accordance with the present invention, can be secured not only to the dashboard, but also to any other selected part of a motor vehicle within the reach of the driver inside of the vehicle. If it is desirable to move away the hand of the vehicle operator slightly from the steering wheel, for the operation of the window wiper and the window-washer, the collapsible wall pump can be built together with the window wiper switch also into the front face of the hub of the steering wheel.

While I have disclosed one embodiment of the present invention, it is to be understood that this embodiment is given by example only and not in a limiting sense, the scope of the present invention being determined by the objects and the claims.

I claim:
1. In a combined wall pump for a windshield washer with an electric switch mechanism for a windshield wiper,
   a switch housing adapted to receive switching means for said electric switch mechanism and to be disposed behind and secured to the dashboard of a vehicle,
   said switch housing having an annular recess extending therethrough in axial direction,
   knob means rotatably and removably mounted in and extending axially in front of and behind said switch housing and operating said electric switch mechanism,
   said knob means comprising a switching member and a flexible bulb open at one side and secured to the front end of said switching member to close said open side of said flexible bulb,
   inlet and outlet valve means disposed at said front end of said switching member disposed within and communicating with said flexible bulb,
   pipe connections included in and extending rearwardly from said switching member and communicating with said valve means,
   so that selectively upon pressing said flexible bulb and upon turning said switching member, said windshield washer and said electric switch mechanism are operated, and
   said knob means being adapted to replace exchangeably a single knob member rotatably received in said switch housing and controlling said electric switch mechanism only.
2. The combination, as set forth in claim 1, in which said switching member includes collapsible spring means extending into said annular recess of said switch housing and releasably retaining said knob means in said switch housing.
3. The combination, as set forth in claim 1, wherein said valve means comprises a feeding valve and a delivery valve,
   each of said valves includes a membrane of resilient material forming integral valve discs,
   a single valve cover covering both said valves and communicating with said flexible bulb, and
   means for clamping said membrane between said valve cover and said switching member.
4. The combination, as set forth in claim 3, wherein said valve cover defines a recess above said valve disk of said feeding valve, and
   said switching member defines a recess below said valve disk of said delivery valve,
   in order to permit a lifting of said valve disks.
5. The combination, as set forth in claim 4, which includes
   a first spring disposed in said recess of said valve cover disposed above and engaging said valve disk of said feeding valve,
   a second spring disposed in said recess of said switching member disposed below and engaging said valve disk of said delivery valve, and
   said springs being adapted to maintain said valve disks in normally closed position.

References Cited in the file of this patent
UNITED STATES PATENTS

| 2,206,814 | Horton | July 2, 1940 |
| 2,936,476 | Ziegler | May 17, 1960 |
| 2,992,448 | Simpson | July 18, 1961 |